United States Patent [19]

Hirose et al.

[11] Patent Number: 5,051,683
[45] Date of Patent: Sep. 24, 1991

[54] REACTIVE POWER CONTROLLER WITHOUT INITIAL ABRUPT DISTURBANCE ON POWER SOURCE

[75] Inventors: Syunichi Hirose, Tokyo; Takeshi Furuhashi, Nagoya, both of Japan

[73] Assignee: Kabushiki Kaisha Toshiba, Kawasaki, Japan

[21] Appl. No.: 543,426

[22] Filed: Jun. 26, 1990

Related U.S. Application Data

[63] Continuation-in-part of Ser. No. 269,292, Nov. 10, 1988, abandoned.

[30] Foreign Application Priority Data

Nov. 12, 1987 [JP]   Japan .................................. 62-284216

[51] Int. Cl.$^5$ .............................................. G05F 1/70
[52] U.S. Cl. ....................................... 323/207; 363/81
[58] Field of Search ..................... 323/207; 307/44, 46, 307/47, 87; 363/81, 87

[56] References Cited

U.S. PATENT DOCUMENTS

4,625,272  11/1986  Okuyama et al. ..................... 323/207
4,890,213  12/1989  Seki ........................................ 307/85

FOREIGN PATENT DOCUMENTS

316804  5/1989  European Pat. Off. .
79478  5/1983  Japan .................................... 363/81
89069  4/1988  Japan .

Primary Examiner—William H. Beha, Jr.
Attorney, Agent, or Firm—Foley & Lardner

[57] ABSTRACT

A reactive power controller for controlling a reactive power output from a self-commutated inverter capable of eliminating an uncontrolled reactive power at the starting moment of its operation. The reactive power controller includes a device for producing a signal indicating amounts to be adjusted of an amplitude and a phase of an output AC voltage of the self-commutated inverter, in accordance with a DC voltage over a DC capacitor and an AC voltage of an AC system power source, and a device for adjusting the amplitude and the phase of the output AC voltage of the self-commutated inverter in accordance with the indication of the producing device.

6 Claims, 7 Drawing Sheets

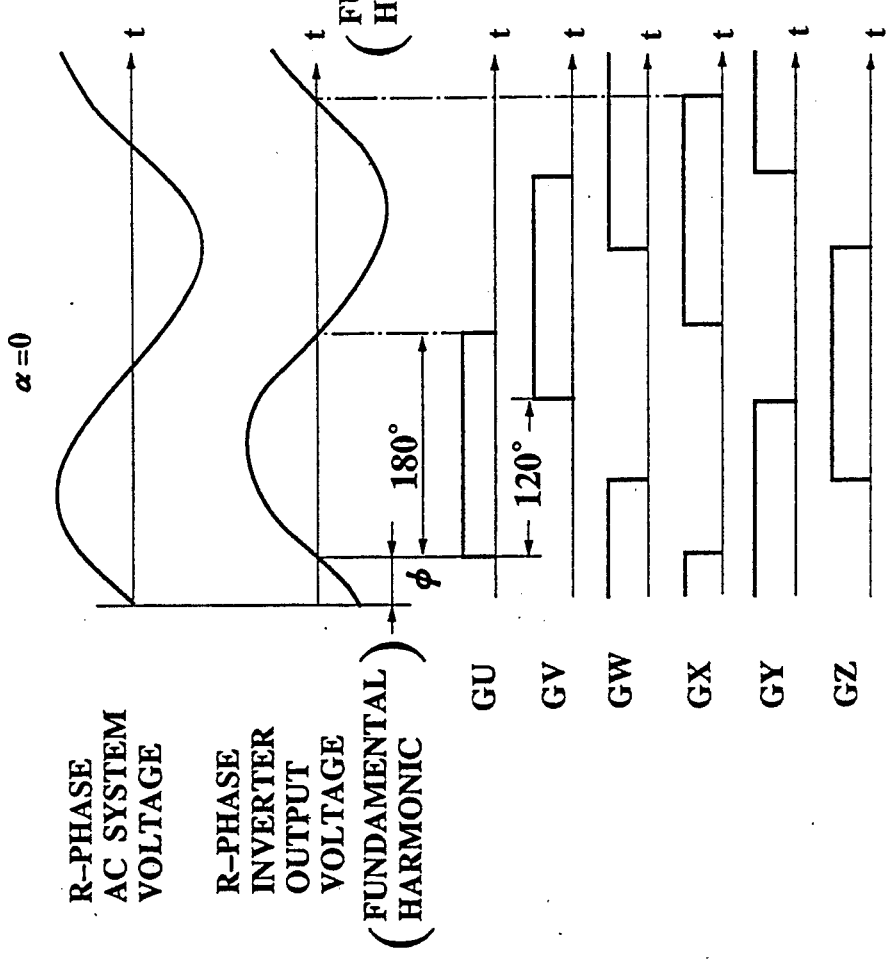
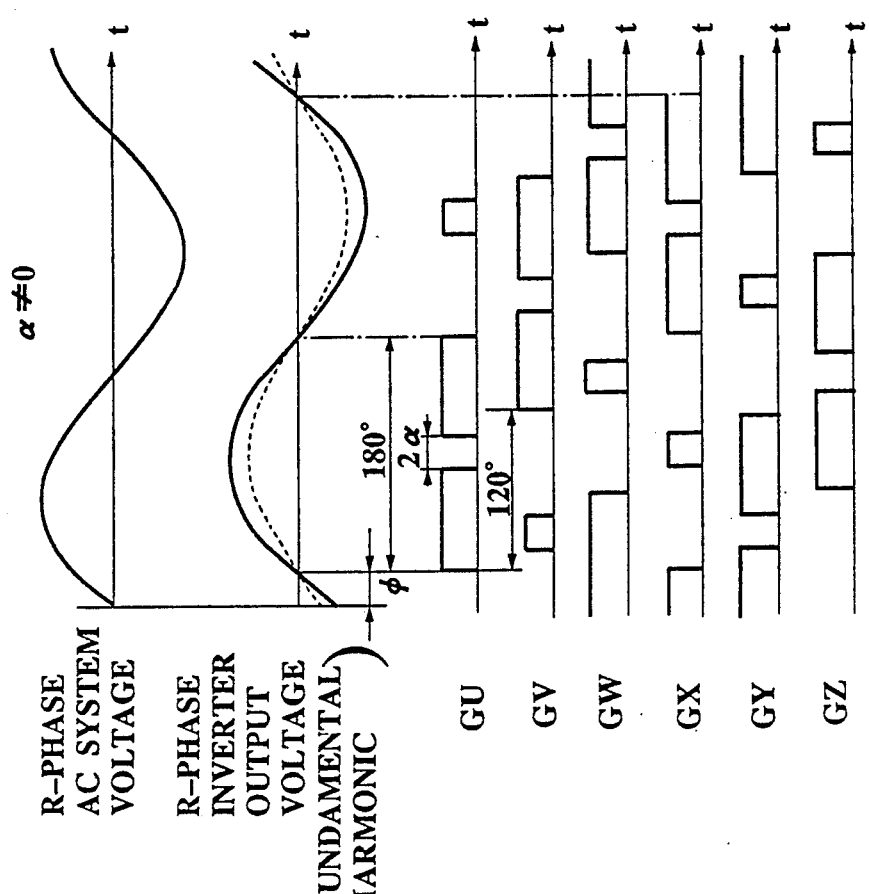

REACTIVE POWER CONTROLLER WITHOUT INITIAL ABRUPT DISTURBANCE ON POWER SOURCE

This is a continuation-in-part application of our earlier copending, commonly assigned application Ser. No. 07/269,292 filed on Nov. 10, 1988, which is now abandoned.

BACKGROUND OF THE INVENTION

1. Field of the Invention

The present invention relates to a voltage-controlled reactive power controller for controlling a reactive power output from a self-commutated inverter connected to an AC system power source by adjusting an output AC voltage of self-commutated inverter.

2. Description of the Background Art

A device for controlling a reactive power output from a self-commutated inverter has been known, as can be found in Japanese Patent Publication No. 59-44646 by Tada et al. or in Japanese Patent Application No. 62-154343 (corresponding to U.S. patent application Ser. No. 203,140) by one of the present inventors, which controls the reactive power output from the self-commutated inverter by regulating a DC voltage on the self-commutated inverter.

Such a device most typically comprises an inverter including controllable rectifier elements such as gate turn-off thyristors (referred hereafter as GTO) and diodes, a DC capacitor connected in parallel to the inverter, a reactor connected between the inverter and an AC system power source, and means for regulating a DC voltage on the inverter.

Now, such a device is known to have a following problem.

Namely, the DC capacitor is charged up by the AC system power source even when the inverter is not in operation in which case the GTOs of the inverter are not conducting electricity. This is due to the fact that the diodes of the inverter are forming a rectifier circuit. The DC voltage over the DC capacitor in this case is equal to $(1.41 \times V_{SY})$ where $V_{SY}$ is the supply voltage of the AC system power source. When the inverter is put in operation so as to control a reactive power, the reactive power due to the DC voltage $(1.41 \times V_{SY})$ over the DC capacitor, which is initially present, cannot be controlled and will affect the AC system power source.

In the prior art reactive power controller, there is provided a control compensator which eventually eliminates the effect of this uncontrolled reactive power. However, the operation of the control compensator to eliminate the effect of the initial uncontrolled reactive power takes a finite amount of time depending on the response speed of the control compensator, so that the adverse effect of the initial uncontrolled reactive power on the AC system power source cannot completely be ignored and remains as an outstanding problem associated with the prior art reactive power controller.

SUMMARY OF THE INVENTION

It is therefore an object of the present invention to provide a reactive power controller capable of eliminating the initial uncontrolled reactive power and thereby realizing an initiation of the reactive power control without an abrupt disturbance on the AC system power source.

This object is achieved in the present invention by providing a reactive power controller, comprising: self-commutated inverter means including controllable rectifier elements and diodes for generating a reactive power; a DC voltage capacitor connected in parallel to the self-commutated inverter means; a coupling reactor connected between the self-commutated inverter means and an AC system power source; means for producing a modulation control signal indicating amounts to be adjusted of an amplitude and a phase of an output AC voltage of the self-commutated inverter means, in accordance with a DC voltage over the DC capacitor and an AC voltage from the AC system power source; and means for adjusting the amplitude and the phase of the output AC voltage of the self-commutated inverter means in accordance with the modulation control signal from the producing means.

Other features and advantages of the present invention will become apparent from the following description taken in conjunction with the accompanying drawings.

BRIEF DESCRIPTION OF THE DRAWINGS

FIGS. 4 (A) and (B) are timing charts for an AC system voltage, an inverter output voltage, and electricity conduction of rectifier elements in the inverter of FIG. 2 for two different cases.

DETAILED DESCRIPTION OF THE PREFERRED EMBODIMENTS

Figure 1:
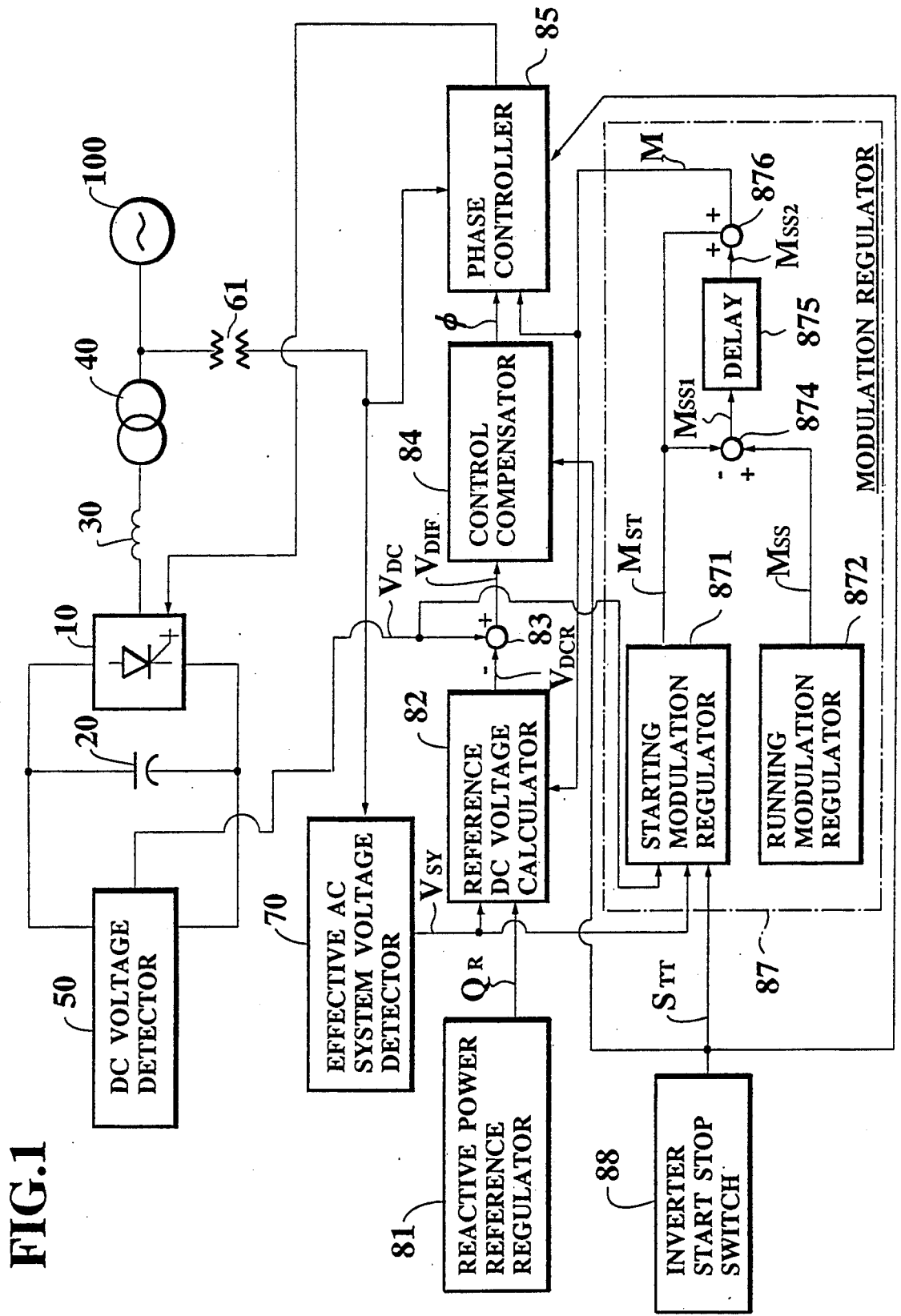
FIG. 1 is a block diagram of one embodiment of a reactive power controller according to the present invention.

Referring now to FIG. 1, there is shown one embodiment of a reactive power controller according to the present invention.

In this embodiment, the reactive power controller comprises an inverter 10 having controllable rectifier elements, a DC capacitor 20 connected in parallel to the inverter 10, a coupling reactor 30 and a coupling transformer 40 which are connected between the inverter 10 and an AC system power source 100, a DC voltage detector 50 connected in parallel to the DC capacitor 20 for producing a DC voltage signal $V_{DC}$, a potential transformer 61 for detecting an AC system voltage, an effective AC system voltage detector 70 connected to the potential transformer 61 for producing a system voltage signal $V_{SY}$, a reactive power reference regulator 81 for producing a reference reactive power signal $Q_R$, a reference DC voltage calculator 82 for producing a reference DC voltage signal $V_{DCR}$ from the system voltage signal $V_{SY}$, the reference reactive power signal $Q_R$, and a modulation control signal M to be explained below, an adder 83 for calculating a voltage difference signal $V_{DIF}=(V_{DC}-V_{DCR})$, a control compensator 84 for producing a phase difference angle $\phi$ between an output AC voltage $V_{IN}$ of the inverter 10 and the system voltage signal $V_{SY}$ from the voltage difference signal $V_{DIF}=(V_{DC}-V_{DCR})$, a phase controller 85 for adjusting periods of electricity conduction of the controllable rectifier elements of the inverter 10 in accordance with the phase difference angle $\phi$ and the modulation control signal M, a modulation regulator 87 for producing the modulation control signal M from the DC voltage signal $V_{DC}$, the system voltage signal $V_{SY}$, and an inverter start signal $S_{TT}$ to be explained below, and an inverter start stop switch 88 for producing the inverter start signal $S_{TT}$.

The modulation regulator 87 further comprises a starting modulation regulator 871 for producing a starting modulation control signal $M_{ST}$ from the DC voltage signal $V_{DC}$, the system voltage signal $V_{SY}$, and the inverter start signal $S_{TT}$, a running modulation regulator 872 for producing a running modulation control signal $M_{SS}$, a first adder 874 for calculating a difference $M_{SS1}=(M_{SS}-M_{ST})$, a delay 875 for performing a delaying operation on the difference $M_{SS1}=(M_{SS}-M_{ST})$ obtained by the first adder 874 in order to obtain a delayed difference signal $M_{SS2}$, and a second adder 876 for calculating a quantity $(M_{ST}+M_{SS2})$ as the modulation control signal M from the starting modulation control signal $M_{ST}$ and the delayed difference signal $M_{SS2}$.

Figure 2:
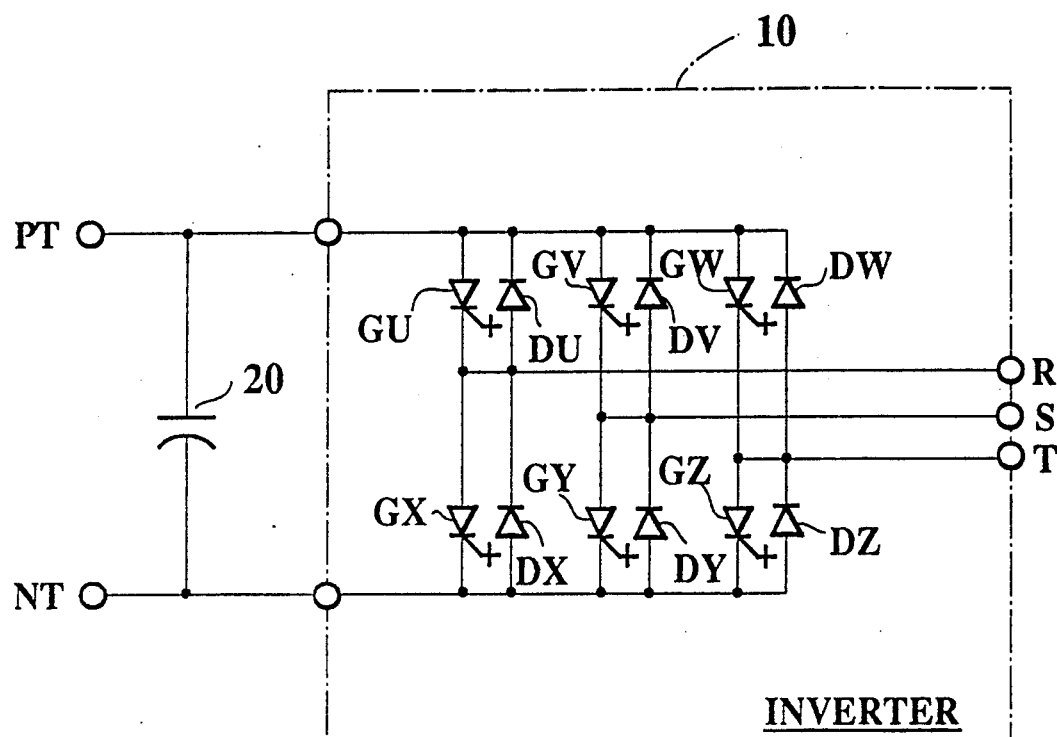
FIG. 2 is a detailed block diagram of an inverter in the reactive power controller of FIG. 1.

FIG. 2 shows a detail configuration of the inverter 10 in this embodiment. The inverter 10 uses GTOs GU, GV, GW, GX, GY, and GZ as the controllable rectifier elements, along with diodes DU, DV, DW, DX, DY, and DZ. A series of the GTOs GU and GX connected in parallel with a series of the diodes DU and DX in an opposite polarity is provided for a terminal R for an R-phase of the output AC voltage. Similarly, a series of the GTOs GV and GY connected n parallel with a series of the diodes DV and DY in an opposite polarity is provided for a terminal S for a S-phase of the output AC voltage, while a series of the GTOs GW and GZ connected in parallel with a series of the diodes DW and DZ in an opposite polarity is provided for a terminal T for a T-phase of the output AC voltage. The GTOs GU, GV, and GW, and the diodes DU, DV, and DW are connected to a positive DC output terminal PT, while the GTOs GX, GY, and GZ, and the diodes DX, DY, and DZ are connected to a negative DC output terminal NT.

Now, this reactive power controller operates as follows.

In this embodiment, the inverter start stop switch 88 provides the inverter start signal $S_{TT}$ to the control compensator 84, the phase controller 85, and the starting modulation regulator 871.

The phase controller 84 outputs zero for the phase difference angle $\phi$ while the inverter start signal $S_{TT}$ is not received, and such a value for the phase difference angle $\phi$ that the voltage difference signal $V_{DIF}=(V_{DC}-V_{DCR})$ becomes Zero when the inverter start signal $S_{TT}$ is received.

The phase controller 85 controls the controllable rectifier elements of the inverter 10 such that the electricity is not conducted through the controllable rectifier elements while the inverter start signal $S_{TT}$ is not received, and that the electricity is conducted through the controllable rectifier elements when the inverter start signal $S_{TT}$ is received.

The starting modulation regulator 871 holds a previously calculated value of the starting modulation control signal $M_{ST}$ while the inverter start signal $S_{TT}$ is not received, and newly calculates the starting modulation control signal $M_{ST}$ when the inverter start signal $S_{TT}$ is received.

Figure 3:
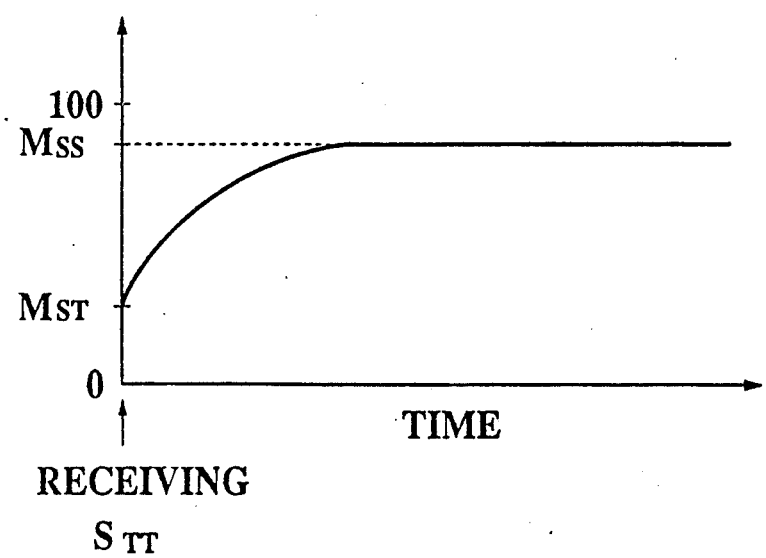
FIG. 3 is a graph of a modulation control signal in the reactive power controller of FIG. 1 as a function of time.

FIG. 3 shows a change in time of the modulation control signal M outputted by the modulation regulator 87. As shown in FIG. 3, the modulation control signal M varies gradually from the starting value $M_{ST}$ originating from a value of the starting modulation control signal $M_{ST}$ at a time of the receiving of the inverter start signal $S_{TT}$ to the running value $M_{SS}$ within a predetermined period of time, as a result of the delaying operation by the delay 875.

Here, the value of the running modulation control signal $M_{SS}$ is predetermined at such a value that the corresponding reactive power Q is equal to the value of the reference reactive power signal $Q_R$, and which is set to be greater than the value of the starting modulation control signal $M_{ST}$ in order not to raise the DC voltage signal $V_{DC}$ to an unnecessarily high level. This latter caution is taken because in the reactive power controller, while the inverter 10 is in operation, the smaller the modulation control signal M is, the higher the DC voltage signal $V_{DC}$ has to be for a given value of the reactive power Q.

More specifically, when the inverter start signal $S_{TT}$ is produced by the inverter start stop switch 88, this reactive power controller operates as follows.

The DC voltage signal $V_{DC}$ representing the voltage detected by the DC voltage detector 50 and the system AC voltage signal $V_{SY}$ representing the voltage detected by the effective AC system voltage detector 70 are fed to the starting modulation regulator 871, and the starting modulation regulator 871 in turn calculates the starting modulation control signal $M_{ST}$ given by an expression:

$$M_{ST} = \frac{k \cdot V_{SY}}{V_{DC}} \tag{1}$$

where k is a constant. Since, in this embodiment, the DC voltage signal $V_{DC}$ is related to the output AC voltage $V_{IN}$ of the inverter 10 by a relationship:

$$V_{IN}=k \cdot V_{DC} \cdot M \tag{2}$$

the equation (1) given above actually corresponds to the general expression for the reactive power Q given by an expression:

$$Q = \frac{V_{IN} \cdot V_{SY} \cdot \cos\phi - V_{SY}^2}{X} \tag{3}$$

where X is the impedance of the combination of the coupling reactor 30 and the coupling transformer 40 with $Q=0$ and $\phi=0$. In other words, the starting modulation regulator 871 produces the starting modulation control signal $M_{ST}$ which makes the reactive power Q equal to zero.

The value of the modulation control signal M is then varied from that of the starting modulation control signal $M_{ST}$ to that of the running modulation control signal $M_{SS}$ gradually, as shown in FIG. 3.

This modulation control signal M from the modulation regulator 87 as well as the system voltage signal $V_{SY}$ from the effective AC system voltage detector 70 and the reference reactive power signal $Q_R$ from the reactive power reference regulator 81 are fed to the reference DC voltage calculator 82, and the reference DC voltage calculator 82 in turn calculates the reference DC voltage signal $V_{DCR}$ given by an expression:

$$V_{DCR} = \frac{X \cdot Q_R + V_{SY}^2}{k \cdot V_{SY} \cdot M} \quad (4)$$

The adder 83 calculates a difference between the DC voltage signal $V_{DC}$ from the DC voltage detector 50 and the reference DC voltage signal $V_{DCR}$ from the reference DC voltage calculator 82, and feeds the resulting voltage difference signal $V_{DIF}=(V_{DC}-V_{DCR})$ to the control compensator 84, and the phase compensator 84 in turn determines the phase difference angle $\phi$ on the basis of the voltage difference signal $V_{DIF}=(V_{DC}-V_{DCR})$ fed from the adder 83.

This phase angle $\phi$ as well as the modulation control signal M from the modulation regulator 87 are fed to the phase controller 85. In this embodiment, the amplitude of the output AC voltage $V_{IN}$ of the inverter 10 is controlled by means of the adjustment of periods of the electricity conduction in the GTOs of the inverter 10, which is carried out by the phase controller 85. Thus, the phase controller 85 adjusts the periods of electricity conduction of the GTOs such that there is a gap of a width $2\alpha$ in the middle of the normal 180° conduction period of each GTO, where a control angle $\alpha$ is related to the modulation control signal M by a relationship:

$$\left. \begin{array}{l} M = 1 - 2\sin\alpha \\ 0° \leq \alpha \leq 60° \\ 0 \leq M \leq 1 \end{array} \right\} \quad (5)$$

FIG. 4(A) shows the conduction periods of GTOs GU, GV, GW, GX, GY, and GZ in relation to the R-phase AC system voltage and the R-phase inverter output voltage (fundamental harmonic) for a case in which $\alpha=0°$, which occurs when M=1, and which is identical to the situation of the conventional reactive power controller. In contrast, FIG. 4(B) shows the conduction periods of GTOs GU, GV, GW, GX, GY, and GZ in relation to the R-phase Ac system voltage and the R-phase inverter output voltage (fundamental harmonic) for a case in which $\alpha \neq 0°$, which occurs when M≠1. In FIG..4(B), the amplitude of the output AC voltage $V_{IN}$ of the inverter 10 is indicated by a dashed line in contrast to that of the case $\alpha=0°$ indicated by a solid line, so as to show the lowering of the amplitude.

The operation as described above can be realized by each element as follows.

Figure 5:
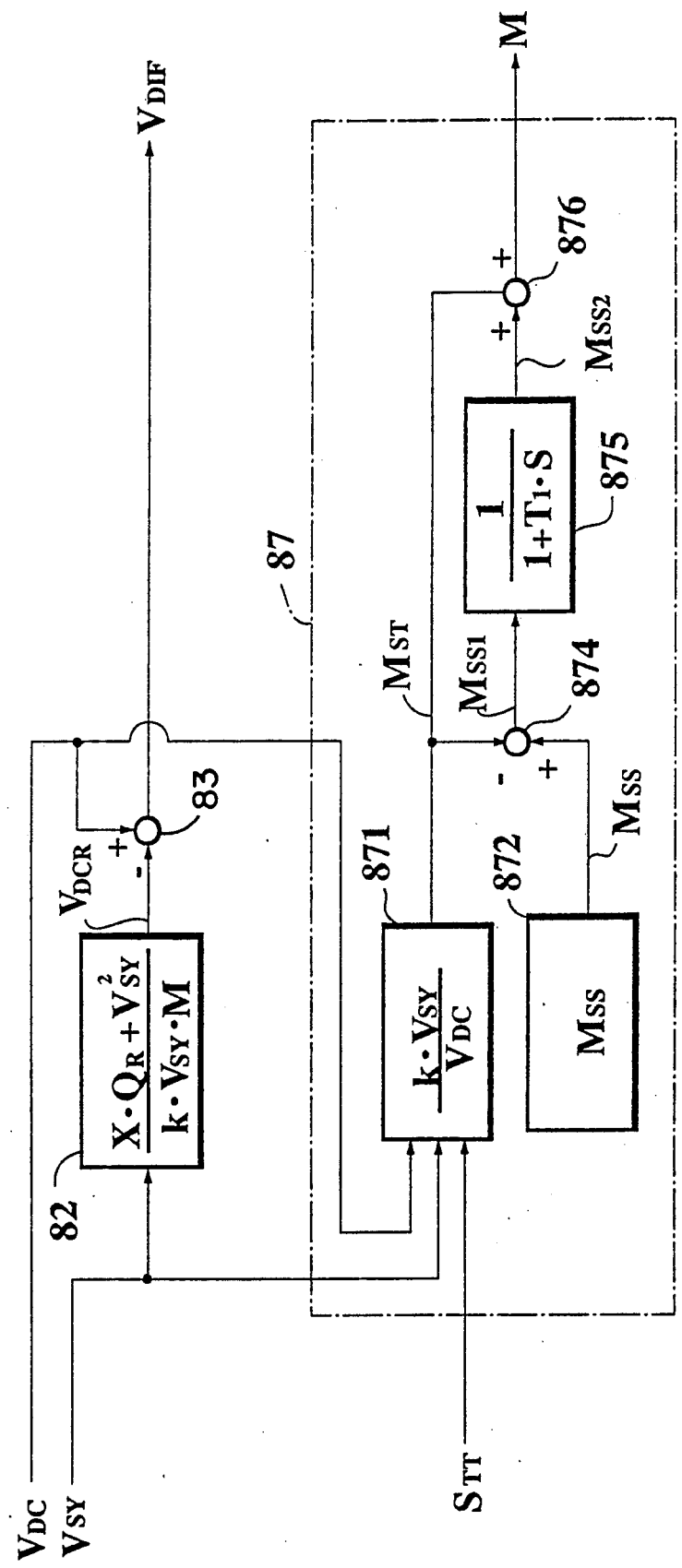
FIG. 5 is a functional block diagram of a modulation regulator in the reactive power controller of FIG. 1 for showing calculation carried out by each element involved and resulting signals.

First, the operations of the reference DC voltage calculator 82, the adder 83, and the modulation regulator 87 can be realized by using a microcomputer. In particular, the calculation at each element involved in the modulation regulator 87 and the flow of the resulting signals as described above can functionally be organized as shown in FIG. 5.

Here, the delay 875 performs the delaying operation $1/1+T1\cdot S$ with a delay constant T1 of 0.1 to 1 sec., which can be implemented by using a microcomputer, as described in R. J. Bibbero, "Microprocessors in Instruments and Control" John Wiley & Sons Inc, New York, 1977.

Figure 6:
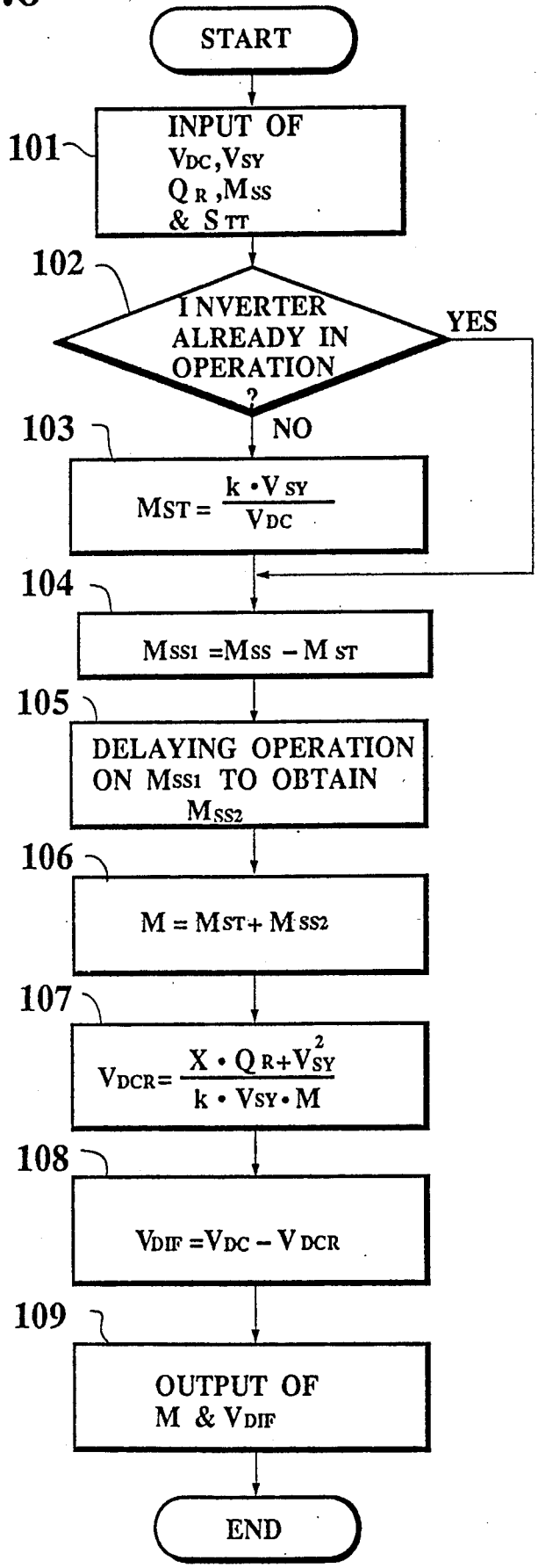
FIG. 6 is a flow chart for calculations to be carried out by a part of the reactive power controller of FIG. 1.

Thus, the operations of the reference DC voltage calculator 82, the adder 83, and the modulation regulator 87 can be implemented as a program to be executed by a microcomputer in a prescribed period of time of 1 to 3 msec., according to the flow chart of FIG. 6, as follows.

Namely, when the DC voltage signal $V_{DC}$, the system AC voltage signal $V_{SY}$. The reference reactive power signal $Q_R$, the running modulation control signal $M_{SS}$, and the inverter start signal $S_{TT}$ are given at the step 101, whether the inverter 10 is already in operation or not is determined by the starting modulation regulator 871 at the step 102.

If the inverter is not already in operation in which case the inverter start signal $S_{TT}$ can be received from the inverter start stop switch 88, the starting modulation regulator 871 newly calculates the starting modulation control signal $M_{ST}$ according to the equation (1) at the step 103, whereas otherwise the step 103 is skipped.

Then at the step 104, the first adder 874 calculates the difference $M_{SS1}=(M_{SS}-M_{ST})$ by adding the running modulation control signal $M_{SS}$ with a negative of the starting modulation control signal $M_{ST}$.

Next, at the step 105, the delay 875 performs the delaying operation on the difference $M_{SS1}=(M_{SS}-M_{ST})$ to obtain the delayed difference signal $M_{SS2}$.

Then, at the step 106, the second adder 876 calculates the modulation control signal M by adding the starting modulation control signal $M_{ST}$ and the delayed difference signal $M_{SS2}$.

Next, at the step 107, the reference DC voltage calculator calculates the reference DC voltage signal $V_{DCR}$ according to the equation (4).

Then, at the step 108, the adder 83 calculates the voltage difference signal $V_{DIF}$ by subtracting the reference DC voltage signal $V_{DCR}$ from the DC voltage signal $V_{DC}$.

Finally, at the step 109, the obtained voltage difference signal $V_{DIF}$ is outputted to the control compensator 84 while the obtained modulation control signal M is outputted to the phase controller 85.

Figure 7:
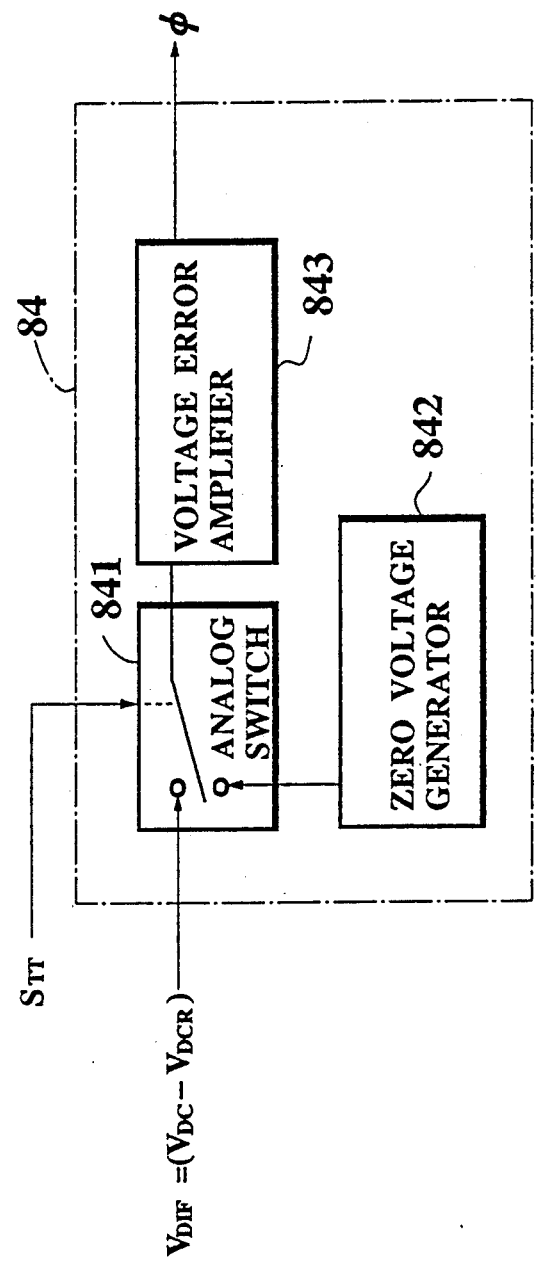
FIG. 7 is a detailed block diagram of a control compensator in the reactive power controller of FIG. 1.

The control compensator 84 can be realized by a configuration shown in FIG. 7.

In the control compensator 84 of FIG. 7, an analog switch 841 operates such that while the inverter start signal $S_{TT}$ is not received a zero voltage from a zero voltage generator 842 is fed to a voltage error amplifier 843, whereas when the inverter start signal $S_{TT}$ is received the voltage difference signal $V_{DIF}$ from the adder 83 is fed to the voltage error amplifier 843. Then, when the voltage difference signal $V_{DIF}$ is fed, the voltage error amplifier 843 determines the phase difference angle on the basis of this voltage difference signal $V_{DIF}$. The voltage error amplifier 843 to perform this operation can be realized by that disclosed in U.S. Pat. Ser. No. 4,330,815.

Figure 8:
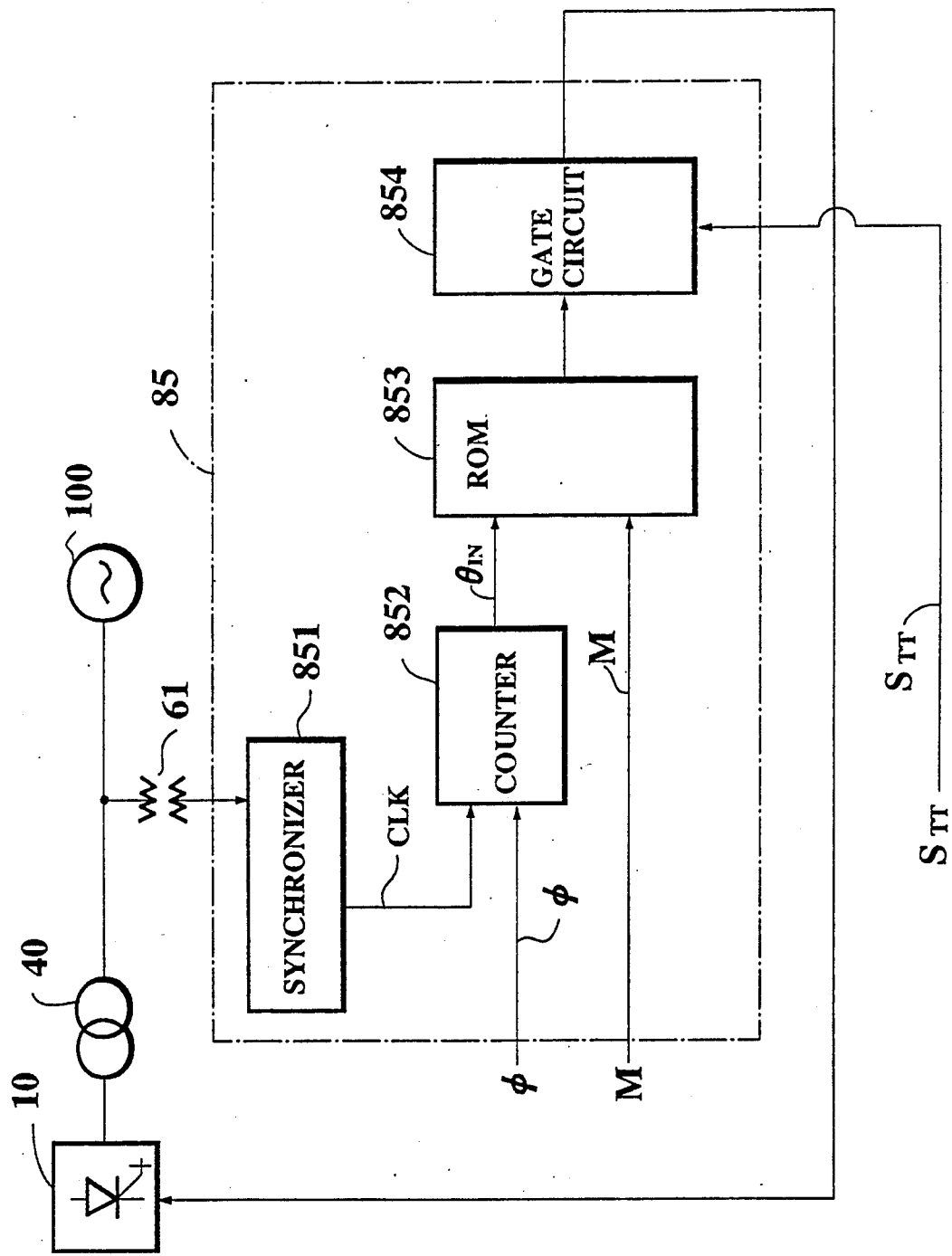
FIG. 8 is a detailed block diagram of a phase controller in the reactive power controller of FIG. 1.

The phase controller 85 can be realized by a configuration shown in FIG. 8.

In the phase controller 85 of FIG. 8, a synchronizer 851 receives the system voltage signal for the AC system power source 100 through the potential transformer 61, generates a clock signal CLK synchronized with the phase of the system voltage, and feeds this clock signal CLK to a counter 852. Such a synchronizer 851 can be realized by that disclosed in U.S. Pat. Ser. No. 4,307,346.

The counter 852 counts the clock signal CLK up to 360° of an electrical angle for the system voltage signal, in which the phase difference angle $\phi$ received from the control compensator 84 is added to the count of the counter 852, so as to obtain an inverter output phase angle $\theta_{IN}$ for the inverter 10.

The obtained inverter output phase angle $\theta_{IN}$ as well as the modulation control signal M from the modulation regulator 87 are then fed as address signals to a ROM 853 which stores information on the periods of the electricity conduction of the GTOs of the inverter 10 calculated by the equation (5) in advance. The information stored in the ROM 853 at the address specified by the inverter output phase angle $\theta_{IN}$ and the modulation control signal M is then fed to a gate circuit 854 which also receives the inverter start signal $S_{TT}$ from the inverter start stop switch 88. When the inverter start signal $S_{TT}$ is received by the gate circuit 854, the gate circuit 854 outputs a control signal to the GTOs of the inverter 10 such that the periods of the electricity conduction of the GTOs of the inverter 10 as shown in FIG. 4(B) can be obtained, whereas otherwise the gate circuit does not outputs such a control signal.

As a result of the operation just described, this reactive power controller succeeds in eliminating the initial uncontrolled reactive power as follows.

When the inverter start stop switch 88 is activated initially, the phase difference angle $\phi$ from the phase compensator 84 is zero and the modulation control signal M from the modulation regulator 87 is equal to $M_{ST}$ given in the equation (2). Consequently, the phase controller 85 adjusts the periods of the electricity conduction of the GTOs of the inverter 10 such that the reactive power Q supplied to the AC system power source 100 is equal to zero. In other words, there is no reactive power supplied to the AC system power source 100 initially. Then, the value of the reactive power Q is gradually brought up to the value equal to the reference reactive power signal $Q_R$ within the predetermined period of time, as the modulation control signal M is gradually increased.

Thus, it is possible in this embodiment of the reactive power controller to eliminate the initial uncontrolled reactive power, and thereby to realize an initiation of the reactive power control without an abrupt disturbance on the AC system power source.

It is to be noted that many modifications and variations of the above embodiments may be made without departing from the novel and advantageous features of the present invention. Accordingly, all such modifications and variations are intended to be included within the scope of the appended claims.

What is claimed is:

1. A reactive power controller, comprising:
   self-commutated inverter means, including controllable rectifier elements and diodes, for generating a reactive power;
   a DC voltage capacitor connected in parallel to the self-commutated inverter means;
   a coupling reactor connected between the self-commutated inverter means and an AC system power source;
   producing means for producing a modulation control signal indicating amounts to be adjusted of an amplitude and a phase of an output AC voltage of the self-commutated inverter means, in accordance with a DC voltage across the DC voltage capacitor and an AC voltage from the AC system power source; and
   adjusting means for adjusting the amplitude and the phase of the output AC voltage of the self-commutated inverter means in accordance with the modulation control signal from the producing means such that reactive power from the self-commutated inverter means at a starting moment of operation of the reactive power controller is suppressed.

2. The reactive power controller of claim 1, wherein the adjusting means further comprises:
   means for specifying a reference DC voltage in accordance with the AC voltage from the AC system power source and the modulation control signal from the producing means;
   control compensator means for determining a phase difference between the output AC voltage of the self-commutated inverter means and the AC voltage from the AC system power source in accordance with the reference DC voltage specified by the specifying means; and
   phase controller means for adjusting the amplitude and the phase of the output AC voltage of the self-commutated inverter means in accordance with the modulation control signal from the producing means and the phase difference determined by the control compensator means.

3. The reactive power controller of claim 1, wherein the producing means further comprises:
   first means for producing a starting modulation control signal indicating amounts to be adjusted of the amplitude and the phase of the output AC voltage of the self-commutated inverter means, at a starting moment of operation of the reactive power controller;
   second means for producing a running modulation control signal indicating amounts to be adjusted of the amplitude and the phase of the output AC voltage of the self-commutated inverter means, after an elapse of a predetermined period of time since the starting moment of operation of the reactive power controller; and
   third means for producing the modulation control signal from the starting modulation control signal and the running modulation control signal, the modulation control signal being varying gradually from a value of the starting modulation control signal at the starting moment to a value of the running modulation control signal after the elapse of the predetermined period of time since the starting moment.

4. The reactive power controller of claim 1, wherein the adjusting means adjusts the amplitude and the phase of the output AC voltage of the self-commutated inverter means by adjusting periods of electricity conduction of the controllable rectifier elements of the self-commutated inverter means in accordance with the modulation control signal from the producing means.

5. The reactive power controller of claim 2, wherein the phase controller means adjusts the amplitude and the phase of the output AC voltage of the self-commutated inverter means by adjusting periods of electricity conduction of the controllable rectifier elements in accordance with the modulation control signal from the producing means and the phase difference determined by the control compensator means.

6. The reactive power controller of claim 1, wherein the adjusting means adjusts the amplitude and the phase of the output ACV voltage of the self-commutated inverter means such that the reactive power from the self-commutated inverter means at a starting moment of operation of the reactive power controller is equal to zero.

* * * * *